(12) United States Patent
Draper (10) Patent No.: US 11,241,909 B2
(45) Date of Patent: Feb. 8, 2022

(54) WHEEL HUB ASSEMBLY AND METHOD THEREFOR

(71) Applicant: Pamela Jeanneret, Middle Ridge (AU)

(72) Inventor: Allen Brian Draper, Middle Ridge (AU)

(73) Assignee: Pamela Jeannert, Middle Ridge (AU)

( * ) Notice: Subject to any disclaimer, the term of this patent is extended or adjusted under 35 U.S.C. 154(b) by 478 days.

(21) Appl. No.: 16/231,720

(22) Filed: Dec. 24, 2018

(65) Prior Publication Data
US 2020/0198394 A1 Jun. 25, 2020

(51) Int. Cl.
*B60B 27/00* (2006.01)

(52) U.S. Cl.
CPC .... *B60B 27/0026* (2013.01); *B60B 2310/228* (2013.01); *B60B 2900/325* (2013.01); *B60B 2900/711* (2013.01)

(58) Field of Classification Search
CPC ..... B60B 27/0026; B60B 27/06; B60B 35/12; B60B 35/121; B60B 37/04; B60B 2310/228; B60B 2900/325; B60B 2900/711
See application file for complete search history.

(56) References Cited

U.S. PATENT DOCUMENTS

| | | | | |
|---|---|---|---|---|
| 1,451,267 A * | 4/1923 | Masury | ................... | B60B 37/10 295/42.1 |
| 2,052,524 A * | 8/1936 | Baker | ................... | B60B 35/121 384/589 |
| 2,145,089 A * | 1/1939 | Kysor | ................... | B60K 17/306 180/259 |
| 2,532,605 A * | 12/1950 | Castleberry | ............. | B60B 37/04 301/1 |
| 2,693,393 A * | 11/1954 | Heth | ....................... | B60B 35/18 301/1 |
| 2,768,698 A * | 10/1956 | Fabian | ................. | B60K 17/306 180/255 |
| 3,289,793 A * | 12/1966 | Goldman | ................ | B60T 1/067 188/18 R |
| 4,331,210 A * | 5/1982 | Petrak | ..................... | B60B 37/08 180/254 |
| 4,351,407 A * | 9/1982 | Call | ....................... | B60B 35/121 180/385 |
| 10,752,050 B2 * | 8/2020 | Coletta | ................... | B60B 27/02 |

* cited by examiner

*Primary Examiner* — Kip T Kotter
(74) *Attorney, Agent, or Firm* — Maier & Maier, PLLC (57) ABSTRACT

The present invention relates to a wheel hub assembly for a vehicle which is suitable for being driven by a drive shaft. The wheel hub assembly includes a wheel engaging hub and a shaft engaging hub including internal splines configured for engagement with complementary external splines on the drive shaft. The shaft engaging hub is engageable with the wheel engaging hub by at least one or more axially extending threaded engaging formations in which the wheel hub assembly further includes an engaging arrangement configured for further facilitating engagement of the wheel engaging hub with the shaft engaging hub. The engaging arrangement includes a plurality of engaging formations extending in a radial direction between the wheel engaging hub and the shaft engaging hub, the plurality of engaging formations are engageable in use with complementary engaging formations to facilitate transfer of torque between the wheel engaging hub and the shaft engaging hub.

8 Claims, 3 Drawing Sheets

PRIOR-ART

WHEEL HUB ASSEMBLY AND METHOD THEREFOR

FIELD OF THE INVENTION

The present invention relates to wheel hub assemblies and in particular to a wheel hub assembly for use with 4WD vehicles.

The invention has been developed primarily for use with 4WD and recreational vehicles in general, and will be described hereinafter with reference to this application. However, it will be appreciated that the invention is not limited to this particular field of use.

BACKGROUND OF THE INVENTION

Present wheel hub assemblies used in recreational vehicles in particular, can suffer from weaknesses in the engagement of the drive flange (also referred to in this specification as a shaft engaging hub) and the wheel hub (also referred to in this specification as a wheel engaging hub). Current wheel hub assemblies rely solely on the cone washer bolts and associated dowels to keep the drive flange and hub securely attached to each other. The effect is that a great deal of load is applied to the wheel cone washer bolts and dowels which tends to lead to fatigue and eventually failure of these components over time. This is particularly problematic with wheel hub assemblies used in certain 4WD models such as certain Toyota LandCruiser™ wheel hub assemblies, especially the rear wheel hub assemblies which tend to take the greatest load when in use.

As will be appreciated, vehicles such as 4WDs typically apply substantial loads and stresses to the mechanical components used in these vehicles. This is partly due to the fact that greater engine power outputs are typically associated with these vehicles, in addition to the more rigorous terrane such vehicles are typically subjected to during their intended use.

As such, there is a need for a means for strengthening components such as wheel hub assemblies in these vehicles due to the greater stresses which they are subjected to in contrast to other passenger vehicles designed for everyday use.

The present invention seeks to provide a means for improving the strength of the attachment of a wheel hub to a drive flange, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

According to a first aspect, the present invention may be said to consist in a wheel hub assembly for a vehicle, the wheel hub assembly being suitable for being driven by a drive shaft, the wheel hub assembly including:

a wheel engaging hub configured for secure engagement to a vehicle wheel;

a shaft engaging hub including internal splines configured for engagement with complementary external splines on the drive shaft, the shaft engaging hub being engageable with the wheel engaging hub by at least one or more axially extending threaded engaging formations;

wherein the wheel hub assembly further includes an engaging arrangement configured for further facilitating engagement of the wheel engaging hub with the shaft engaging hub, the engaging arrangement including a plurality of engaging formations extending in a generally radially outwardly between the wheel engaging hub and the shaft engaging hub, the plurality of engaging formations being engageable in use with complementary engaging formations to facilitate transfer of torque between the wheel engaging hub and the shaft engaging hub.

In one embodiment, the plurality of engaging formations extend substantially around the periphery of a circumference selected from the group consisting of:

the wheel engaging hub; and the shaft engaging hub.

In one embodiment, the plurality of engaging formations are absent adjacent the axially extending threaded engaging formations.

In one embodiment, the plurality of engaging formations are straight cut teeth, adapted to engage each other in a complementary manner.

In one embodiment, the plurality of engaging formations comprise a screw thread on the wheel engaging hub with a complementary screw thread on the shaft engaging hub.

In one embodiment, the plurality engaging formations are helical formations adapted to engage each other in a complementary manner.

In one embodiment, the helical formations are cut such that when in use, forces between the wheel engaging hub and the shaft engaging hub are directed towards each other.

In one embodiment, the plurality of engaging formations are absent at the location of the axially extending threaded engaging formations.

According to a further aspect, the present invention may be said to consist of a wheel hub assembly for a vehicle, the wheel hub assembly being suitable for being driven by a drive shaft, the wheel hub assembly including:

a wheel engaging hub configured for secure engagement to a vehicle wheel;

a shaft engaging hub including internal splines configured for engagement with complementary external splines on the drive shaft;

the shaft engaging hub being engageable with the wheel engaging hub by at least one or more axially extending threaded engaging formations:

wherein the wheel hub assembly further includes an engaging arrangement configured for further facilitating engagement of the wheel engaging hub with the shaft engaging hub, the engaging arrangement including a plurality of engaging formations extending substantially about the periphery of one selected from the wheel engaging hub and the shaft engaging hub, the plurality of engaging formations being engageable in use with complementary engaging, formations on the other of the wheel engaging hub and the shaft engaging hub.

In one embodiment, the engaging arrangement includes an annular flange, and the plurality of engaging formations extend substantially about the circumference of the annular flange.

In one embodiment, the annular flange is received within a complimentary recess in the wheel engaging hub.

In one embodiment, the one or more axially extending threaded engaging formations are configured for clamping the shaft engaging hub and the wheel engaging hub together in a direction parallel to the axial direction of the drive shaft.

According to a further aspect, the present invention may be said to consist of a wheel engaging hub adapted for engagement with a shaft engaging hub, the wheel engaging hub comprising:

a plurality of engaging formations, the plurality of engaging formations extending in a radial direction and being adapted to engage with complementary engaging formations on the shaft engaging hub.

In one embodiment, the plurality of engaging formations extend substantially around the periphery of the circumference of the wheel engaging hub.

According to yet another aspect, the present invention may be said to consist of a shaft engaging hub adapted for engagement with a wheel engaging hub, the shaft engaging hub comprising:

a plurality of engaging formations, the plurality of engaging formations extending in a radial direction and being adapted to engage with complementary engaging formations or the wheel engaging hub.

In one embodiment, the plurality of engaging formations extend substantially around the periphery of the circumference of the shaft engaging hub.

According to a further aspect, the present invention may be said to consist of a modification method for facilitating the transfer of torque between a shaft engaging hub and a wheel engaging hub in a wheel hub assembly, the modification method including the steps of:
  a. machining at least one or more radially extending engaging formations into the wheel engaging hub; and
  b. providing a replacement shaft engaging hub including complementary engaging formations configured for engaging with the radially extending engaging formations on the wheel engaging hub.

According to another aspect, the present invention may be said to consist of a modification method for facilitating the transfer of torque between a shaft engaging hub and a wheel engaging hub in a wheel hub assembly, the modification method including the steps of:
  removing the shaft engaging hub from the wheel engaging hub;
  machining at least one or more radially extending engaging formations into the wheel engaging hub; and
  providing a replacement shaft engaging hub including complementary engaging formations configured for engaging with the radially extending engaging formations on the wheel engaging hub.

According to a first aspect, the present invention may be said to consist in a wheel hub assembly for a vehicle, the wheel hub assembly being suitable for being driven by a drive shaft, the wheel hub assembly including:

a wheel engaging hub configured for secure engagement to a vehicle wheel, the wheel engaging hub including at least one or more selected from a radially inner surface and a radially outer surface;

a shaft engaging hub including internal splines configured for engagement with complementary external splines on the drive shaft, the shaft engaging hub including at least one or more selected from a radially inner surface and a radially outer surface;

the shaft engaging hub being engageable with the wheel engaging hub by at least one or more axially extending threaded engaging formations;

wherein the wheel hub assembly further includes an engaging arrangement configured for further facilitating engagement of the wheel engaging hub with the shaft engaging hub for the transfer of torque between the shaft engaging hub and the wheel engaging hub, the engaging arrangement including at least one or more engaging formations located on the one or more selected from a radially inner surface and a radially outer surface of the wheel engaging hub that are engageable with at least one or more complementary engaging formations on the one or more selected from a radially inner surface and a radially outer surface of the shaft engaging hub.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Other aspects of the invention are also disclosed.

BRIEF DESCRIPTION OF THE DRAWINGS

Notwithstanding any other forms which may fall within the scope of the present invention, a preferred embodiment of the invention will now be described, by way of example only, with reference to the accompanying drawings in which:

FIG. 4 exemplifies the modification of the wheel engaging hub through the use of a CNC machine or similar.

DESCRIPTION OF EMBODIMENTS

It should be noted in the following description that like or the same reference numerals in different embodiments denote the same or similar features.

A wheel hub assembly according to a first aspect of the invention is generally indicated by the numeral 1000, In one embodiment now described, a wheel hub assembly 1000 for use in a vehicle such as a recreational vehicle or more specifically, a 4WD is provided. However, it will be appreciated that the embodiment described is not solely limited to such applications.

Figure 1:
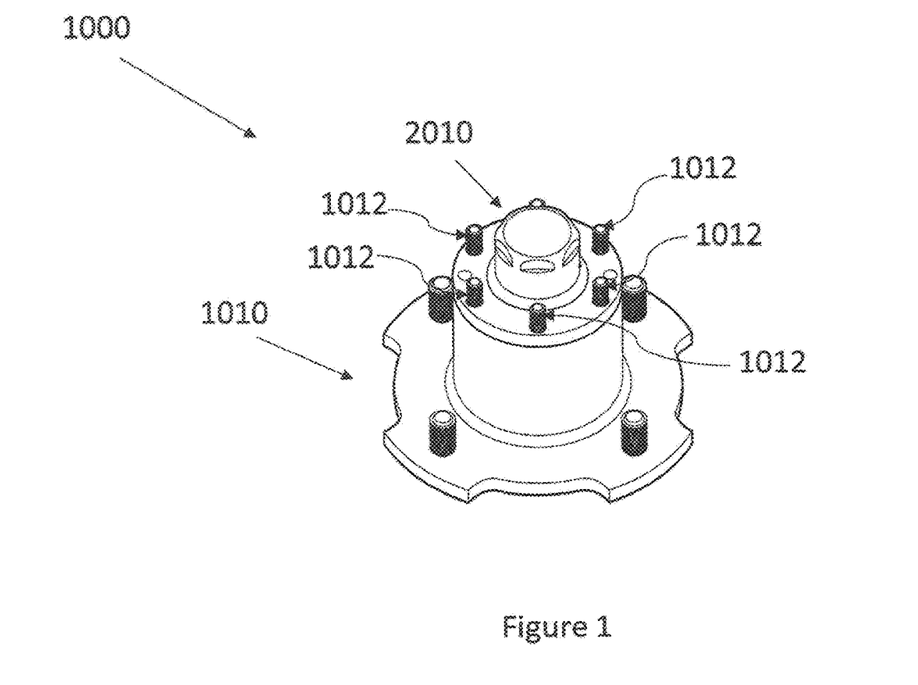
FIG. 1 is a perspective view of a wheel hub assembly in accordance with a preferred embodiment of the present invention.

As is shown in FIG. 1, the wheel hub assembly 1000 comprises a wheel engaging hub 1010 and a shaft engaging hub 2010. The wheel engaging hub 1010 is adapted for attachment to a vehicle wheel (not shown), whereas the shaft engaging hub 2010 is adapted for engagement to a drive shaft (not shown) as will be discussed below.

The shaft engaging hub 2010 may also be referred to in the industry as a drive flange and the wheel engaging hub 1010 may also be referred to as a hub.

Figure 2:
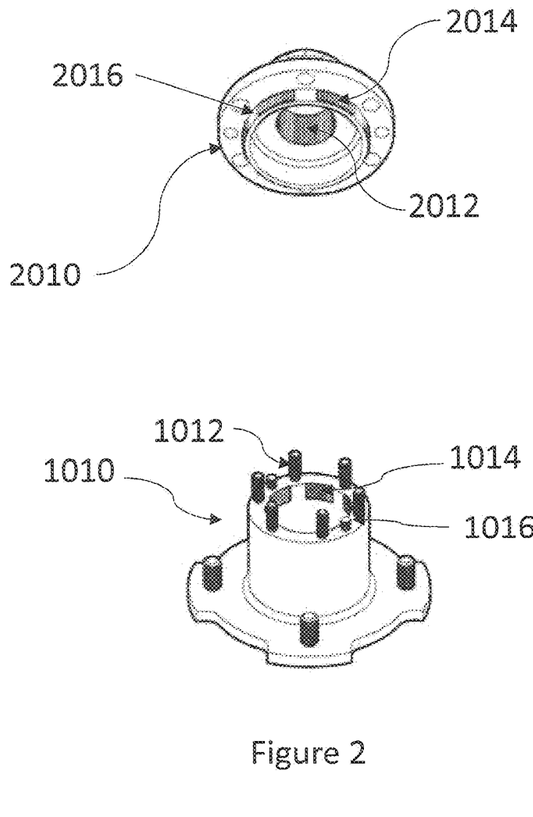
FIG. 2 is an exploded view of the wheel hub assembly of FIG. 1.

The shaft engaging hub 2010 is adapted for connection to a drive shaft (not shown), through the use of a conventional spline arrangement, which is known in the art, in which the drive shaft (not shown) is engaged with the shaft engaging hub 2010 through internal splines 2012 as shown in FIG. 2. The Internal splines 2012 of the shaft engaging hub 2010 are of a straight cut configuration allowing for lateral movement of the drive shaft (not shown) within the shaft engaging hub 2010.

The drive shaft (not shown) is of the conventional variety which is known in the art, with a splined end which is adapted for engagement with the internal splines 2012 of the shaft engaging hub 2010. The engagement of the splined end of the drive shaft (not shown), having complementary external splines (not shown) with the internal splines 2012 of the shaft engaging hub 2010 allows for the transfer of torque from the drive shaft (not shown) to the shaft engaging hub 2010, and also provides for a degree of lateral movement of the drive shaft (not shown) within the shaft engaging hub 2010. Typically when in use, the drive shaft (not shown) is connected to a differential (not shown) situated in the vehicle in order to transfer torque from the differential gears to the shaft engaging hub 2010, and in turn through the wheel engaging hub 1010 which rotates the wheels which are attached to the wheel engaging hub 1010 to propel the vehicle along.

As previously discussed, the drive shaft (not shown) transfers torque to the shaft engaging hub 2010 through the engagement of the splines of the drive shaft and the complementary internal splines 2012 of the shaft engaging hub 2010. The internal splines 2012 further allow for relative movement of the drive shaft (not shown) in relation to the shaft engaging hub 2010 while allowing for the transfer of torque from the drive shaft (not shown) to the shaft engaging hub 2010.

The shaft engaging hub 2010 is attached to the wheel engaging hub 1010 by the use of axially extending threaded engaging formations 1012 which typically take the form of threaded bolts, threaded shafts or other appropriate fixing means. Furthermore, dowels 1016 or the like may be used to provide additional strength in attaching the shaft engaging hub 2010 to the wheel engaging hub 1010.

The axially extending threaded engaging formations 1012 are primarily used to provide both frictional engagement and resistance to rotational and lateral movement of the shaft engaging hub 2010 in relation to the wheel engaging hub 1010. This resistance to movement of the shaft engaging hub 2010 in relation to the wheel engaging hub 1010 is achieved through the restrictive nature of the axially extending threaded engaging formations 1012, which in this embodiment are threaded bolts 1012, which when tightened with a nut (not shown) at an appropriate torque provide a means of attachment of the shaft engaging hub 2010 to the wheel engaging hub 1010.

As can be seen in the embodiment shown in FIG. 2, the shaft engaging hub comprises an annular flange 2016 located about the internal periphery of the shaft engaging hub 2010.

The annular flange 2016 forms part of an engaging arrangement and further comprises a plurality of complementary engaging formations 2014 which extend radially outwardly between the shaft engaging hub 2010 and the wheel engaging hub 1010 and extend substantially about the periphery of the wheel engaging hub 1010. The complementary engaging formations 2014 are adapted for engagement with the plurality of engaging formations 1014 which are also located substantially about the periphery of the shaft engaging hub 2010 and are part of the engaging arrangement on the wheel engaging hub 1010. The engaging formations 2014, 1014, which comprise the engaging arrangement assist the axially extending threaded engaging formations 1012 and the dowels 1016 to resist the rotational mechanical load that exists between the shaft engaging hub 2010 and the wheel engaging hub 1010 when in use and under load.

The annular flange 2016 may be an integral part of the shaft engaging hub 2010 or may be adapted for fixing to an existing shaft engaging hub 2010 such as that shown in FIG. 2. In the case that the annular flange 2016 may be fitted to the shaft engaging hub 2010 by inter alia the use of shrink-fitting or a means of threaded attachment. With the use of shrink-fitting it would be envisaged that the shaft engaging hub 2010 may be heated between 150-300 Celsius by various means including induction heating, causing the shaft engaging hub 2010 to expand sufficiently such that the annular flange 2016 may be inserted into the opening of the shaft engaging hub 2010. The shaft engaging hub 2010 would then be allowed to contract over the annular flange 2016 upon cooling, providing a secure friction fit between the shaft engaging hub 2010 and the annular flange 2016.

Preferably, the annular flange 2016 is an integral part of the shaft engaging hub 2010 providing maximal strength when in use. Furthermore, the junction between the shaft engaging hub 2010 and the annular flange 2016 preferably has a substantially curved interface between the annular flange 2016 and the shaft engaging hub 2010. The substantially curved interface will result in load distribution that is more evenly distributed between the junction of the annular flange 2016 and the shaft engaging hub 2010 when in use.

As can be seen in FIG. 2, the plurality of engaging formations 1014 are formed on the interior periphery of the wheel engaging hub 1010, the means of which will be described later. The shaft engaging hub 2010 comprises a plurality of complementary engaging formations 2014 which are formed around a periphery of the shaft engaging hub 2010. As previously discussed, the complementary engaging formations 2014 are adapted to securely engage with the engaging formations 1014 on the wheel engaging hub 1010.

The engaging formations 1014 located on the wheel engaging hub 1010 are adapted to engage with the complementary engaging formations 2014 located on the shaft engaging hub 2010 for the purpose of increasing the resistance to rotational movement about the axis of the shaft engaging hub 2010 in relation to the wheel engaging hub 1010, when torque is being transferred from the drive shaft (not shown) to the shaft engaging hub 2010 and to the wheel engaging hub 1010, FIG. 2 shows an exploded view of the wheel hub assembly 1000 with a detailed view of the shaft engaging hub 2010 showing the underside with the internal splines 2012 for engaging a drive shaft with complementary engaging splines (not shown) and a plurality of complementary engaging formations 2014 which are adapted to engage with the plurality of engaging formations 1014 on the wheel engaging hub 1010. The complementary engaging formations 2014 and the engaging formations 1014 are adapted to securely attach the shaft engaging hub 2010 with the wheel engaging hub 1010 so as to prevent the movement of the shaft engaging hub 2010 in relation to the wheel engaging hub 1010. In the embodiment shown, the engaging formations 2014, 1014 are a plurality of straight cut formations adapted to engage in an interdigitated fashion. As will be discussed below, the engaging formations 2014, 1014 may take a variety of different forms each with certain advantages.

In another embodiment (not shown) the engaging formations may be helical cut formations providing a larger contact surface area between the engaging formations. The helical engaging formations would be preferably cut such that when the rotational forces applied between the shaft engaging hub 2010 and the wheel engaging hub 1010 which occur through use, the manner in which the helical engaging formations are angled will cause the shaft engaging hub

2010 to mate with the wheel engaging hub 1010 with a force that is proportional to the amount of torque applied to the drive shaft associated with the wheel hub assembly 1000. It will be appreciated that in this embodiment the bolts 1012 and dowels 1016 would need to be inserted after the attachment of the shaft engaging hub 2010 is attached to the wheel engaging hub 1010.

In yet another embodiment, the engaging formations 2014, 1014 may comprise a threaded formation where the wheel engaging hub 1010 would be threaded onto the shaft engaging hub 2010. In this embodiment, the loading would be provided through the threads of the threaded formation. Preferably the thread would be cut in a direction such that the forces produced by the torque of the drive shaft would cause the thread to rotate in such a direction so as to tighten the thread under load. In this situation, the engagement of the shaft engaging hub 2010 with the wheel engaging hub 1010 are forced against each other under rotational torque load. Due to the use of a threaded formation of engagement of the shaft engaging hub 2010 to the wheel engaging hub 1010, it will be appreciated that the bolts 1012 and dowels 1016 would need to be inserted into the wheel engaging hub 1010 after the wheel engaging hub 101 has been threadably attached to the shaft, engaging hub 2010.

Figure 3:
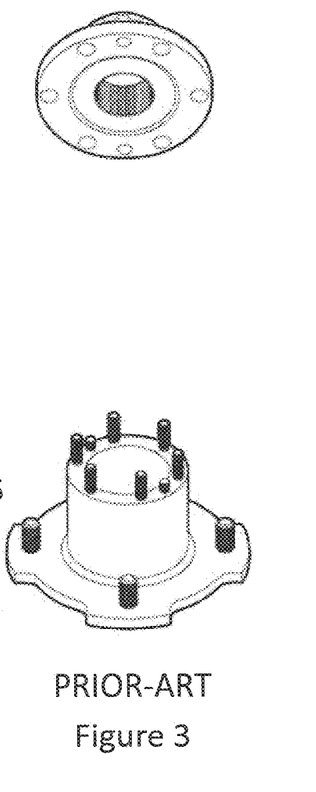
FIG. 3 shows the prior-art wheel hub assembly.

For comparison with the embodiment of the invention shown in FIG. 2, FIG. 3 shows an example of existing (prior-art) wheel hub assembly in exploded view with the absence of engaging formations being evident, with a substantial portion of the load being applied to the attachment bolts and the dowels which are attached to the wheel engaging hub.

Returning to FIG. 2, it can be seen in this embodiment of the invention that the plurality of engaging formations 1014 and the complementary engaging formations 2014 are located between the areas adjacent the bolts 1012 and are not located beneath the location of the bolts 1012. This is so as not to weaken the bolts anchor points within the wheel engaging hub 1010. This is due to the fact that the plurality of engaging formations 1014 by their nature, remove the amount of material proximal to the bolt 1012 and can weaken the anchor point for the bolt 1012. It has been found that the absence of the plurality of engaging formations 1014 directly below the location of the bolts 1012 will have minimal effect on the ability of the engaging formations to operate as designed, which is primarily to reduce the torsional load on the bolts 1012.

Figure 4:
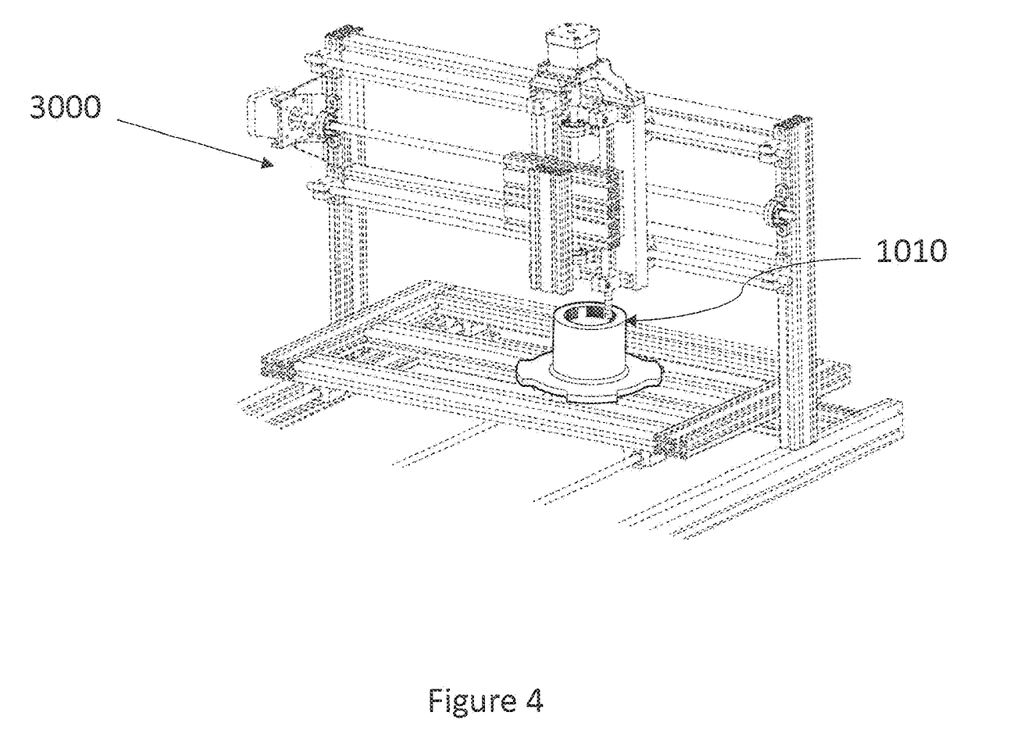

As is shown in FIG. 4, the wheel engaging hub 1010 may be a modified conventional hub (such as shown in FIG. 3) where the conventional hub has the plurality of engaging formations 1014 and/or the complementary engaging formations 2014 produced using a CNC machine 3000 as an example. Alternatively, the wheel engaging hub may be manufactured with the plurality of engaging formations 1014 and the complementary engaging formations 2014 on the production line in the form of an off the shelf product.

The plurality of engaging formations 1014 and complementary engaging formations 2014 may be cast as part of the hub in the metal casting process used to manufacture the wheel hub assembly 1000. Conventional forging methods known in the art may also be used to create the wheel hub assembly 1000 including the engaging formations 2014 and 1014.

As is exemplified in FIG. 4, an unmodified wheel engaging hub 1010 as shown in FIG. 3 may be secured onto the CNC machine 3000, where a CNC control program is then loaded with a program for control of the CNC machine 3000. Once the program is loaded the broaching (cutting) may commence, which produces a female (internal) spline which in one embodiment is in six (6) equal sections.

As was previously discussed, the wheel engaging hub 1010 may be placed into the CNC machine 3000, and the program is loaded. The first step is machining the material to size, followed by drilling the cone washer bolt and dowel holes. The standard female (internal) spline in then broached. The CNC machine 3000 and wheel engaging hub 1010 are re-set to broach the male (external) spline which in one embodiment is in six (6) equal sections, which engage into the splined shaft engaging hub 2010.

It is envisaged that the wheel hub assembly 1000 will be either sold as an off the shelf part or alternatively, the wheel hub assembly may be provided as a kit in which a shaft engaging hub 2010 is provided and an existing wheel engaging hub 1010 is modified as shown in FIG. 4 by the use of a CNC or milling machine 3000 or similar.

In the circumstance where a person desires an upgrade to their wheel hub assembly, it may be more cost effective to modify the current wheel hub assembly rather than to replace it entirely. In such a situation, the wheel hub assembly 1000 would be removed from the vehicle to which it is attached and disassembled. Once the wheel hub assembly 1000 is disassembled into its constituent parts, the shaft engaging hub as shown in FIG. 3 would need to be discarded and replaced with a modified shaft engaging hub.

In other embodiments, the wheel hub assembly 1000 may be replaced as an entire unit instead of the presently attached unit being removed for modification.

INTERPRETATION

Markush Groups

In addition, where features or aspects of the invention are described in terms of Markush groups, those skilled in the art will recognize that the invention is also thereby described in terms of any individual member or subgroup of members of the Markush group.

Chronological Sequence

For the purpose of this specification, where method steps are described in sequence, the sequence does not necessarily mean that the steps are to be carried out in chronological order in that sequence, unless there is no other logical manner of interpreting the sequence.

Embodiments:

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects Re in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, it ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description, Terminology In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward" "radially", "peripherally", "upwardly", "downwardly", and the like are used as words of convenience to provide reference points and are not to be construed as limiting terms.

For the purposes of this specification, the term "plastic" shall be construed to mean a general term for a wide range of synthetic or semisynthetic polymerization products, and generally consisting of a hydrocarbon-based polymer.

As used herein the term "and/or" means "and" or "or", or both.

As used herein "(s)" following a noun means the plural and/or singular forms of the noun.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

Industrial Applicability

It is apparent from the above, that the arrangements described re applicable to the mechanical engineering industries.

The invention claimed is:

1. A wheel hub assembly for a vehicle, the wheel hub assembly being suitable for being driven by a drive shaft, the wheel hub assembly including:
   a. a wheel engaging hub configured for secure engagement to a vehicle wheel;
   b. a shaft engaging hub including internal splines configured for engagement with complementary external splines on the drive shaft;
   c. the shaft engaging hub being engageable with the wheel engaging hub by at least one or more axially extending threaded engaging formations;
   d. wherein the wheel hub assembly further includes an engaging arrangement configured for further facilitating engagement of the wheel engaging hub with the shaft engaging hub,
      i. the engaging arrangement including an annular flange extending from the shaft engaging hub, and a plurality of engaging formations on the annular flange, the plurality of engaging formations extending between the wheel engaging hub and the shaft engaging hub,
      ii. the plurality of engaging formations being engageable in use with complementary engaging formations on the wheel engaging hub to facilitate transfer of torque between the wheel engaging hub and the shaft engaging hub, and wherein the plurality of complementary engaging formations are absent adjacent the axially extending threaded engaging formations.

2. The wheel hub assembly of claim 1, wherein the plurality of engaging formations extend substantially around the periphery of a circumference selected from the group consisting of:
   a. the wheel engaging hub; and
   b. the shaft engaging hub.

3. The wheel hub assembly of claim 2, wherein the plurality of engaging formations are straight cut teeth, adapted to engage each other in a complementary manner.

4. A wheel hub assembly for a vehicle, the wheel hub assembly being suitable for being driven by a drive shaft, the wheel hub assembly including:
   a. a wheel engaging hub configured for secure engagement to a vehicle wheel;
   b. a shaft engaging hub including internal splines configured for engagement with complementary external splines on the drive shaft;
   c. the shaft engaging hub being engageable with the wheel engaging hub by at least one or more axially extending threaded engaging formations;

d. wherein the wheel hub assembly further includes an engaging arrangement configured for further facilitating engagement of the wheel engaging hub with the shaft engaging hub,
   i. the engaging arrangement including an annular flange extending from one of the wheel engaging hub and the shaft engaging hub, the annular flange including a plurality of engaging formations extending between the annular flange and the other of the wheel engaging hub and the shaft engaging hub, substantially about the periphery of the annular flange,
   ii. the plurality of engaging formations being engageable in use with complementary engaging formations extending between the other of the wheel engaging hub and the shaft engaging hub and the annular flange, and wherein the engaging formations are absent adjacent the axially extending threaded engaging formations.

5. The wheel hub assembly of claim 4, wherein the plurality of engaging formations extend substantially about the circumference of the annular flange.

6. The wheel hub assembly of claim 5, wherein the annular flange is received within a complimentary recess in the wheel engaging hub.

7. The wheel hub assembly of claim 6, wherein the one or more axially extending threaded engaging formations are configured for clamping the shaft engaging hub and the wheel engaging hub together in a direction parallel to the axial direction of the drive shaft.

8. A modification method for facilitating the transfer of torque between a shaft engaging hub and a wheel engaging hub in a wheel hub assembly, the modification method including the steps of:
   a. removing the shaft engaging hub from the wheel engaging hub;
   b. machining at least one or more radially extending engaging formations into the wheel engaging hub; and
   c. providing a replacement shaft engaging hub including complementary engaging formations configured for engaging with the radially extending engaging formations on the wheel engaging hub.

* * * * *

UNITED STATES PATENT AND TRADEMARK OFFICE
CERTIFICATE OF CORRECTION

| | | |
|---|---|---|
| PATENT NO. | : 11,241,909 B2 | Page 1 of 1 |
| APPLICATION NO. | : 16/231720 | |
| DATED | : February 8, 2022 | |
| INVENTOR(S) | : Allen Brian Draper | |

It is certified that error appears in the above-identified patent and that said Letters Patent is hereby corrected as shown below:

On the Title Page

Under (73) Assignee:
"Pamela Jeannert, Middle Ridge (AU)"

Should be:
"Pamela Jeanneret, Middle Ridge (AU)"

Signed and Sealed this
Eighth Day of July, 2025

Coke Morgan Stewart
*Acting Director of the United States Patent and Trademark Office*